Patented May 16, 1950

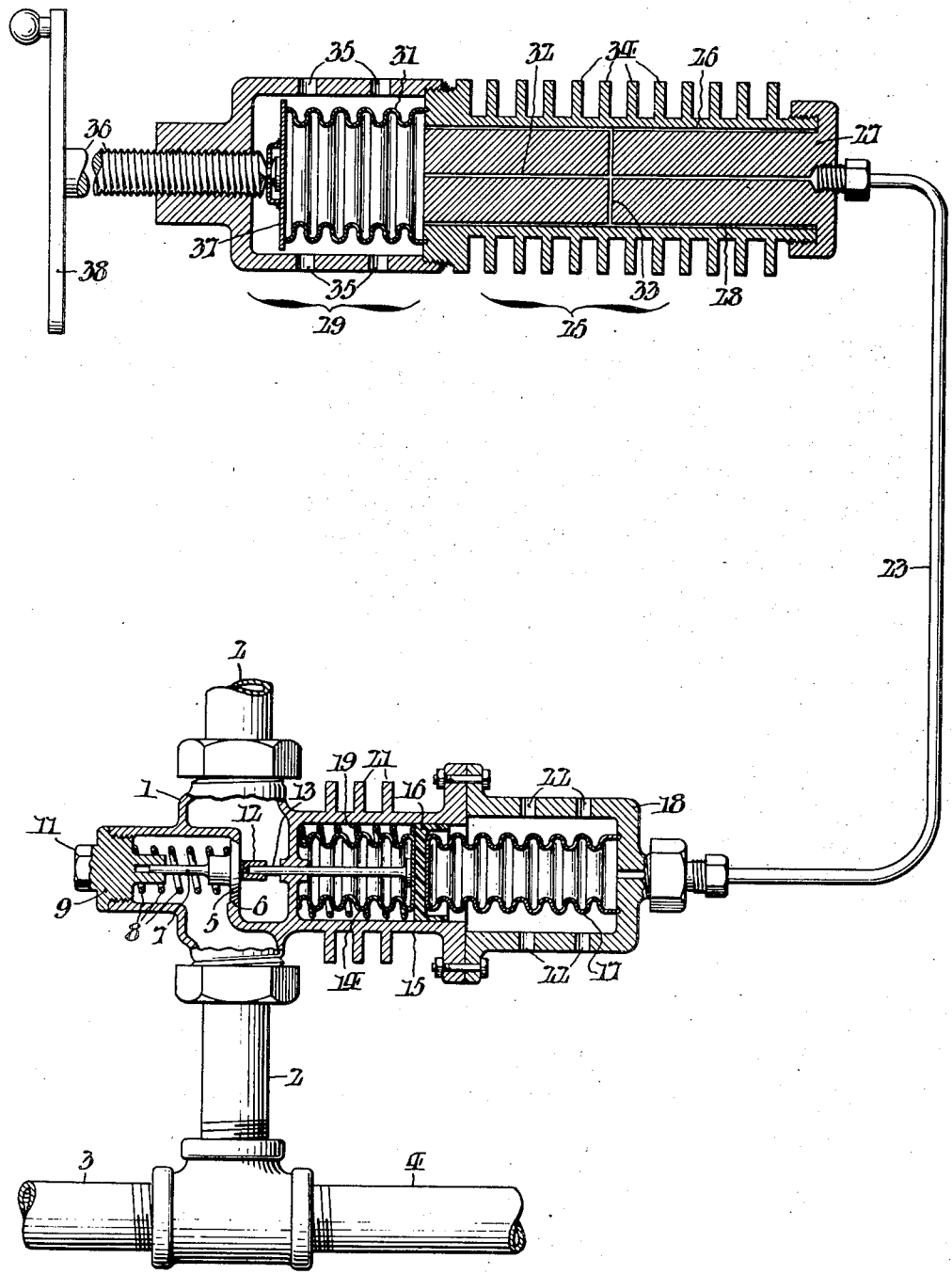

2,507,911

UNITED STATES PATENT OFFICE 2,507,911

THERMOSTATIC CONTROL FOR REFRIGERATING APPARATUS

William M. Keller, Merion, Pa., assignor to The Pennsylvania Railroad Company, Philadelphia, Pa., a corporation of Pennsylvania Application September 6, 1946, Serial No. 695,315

6 Claims. (Cl. 62—127)

This invention relates to a thermostatic control system for refrigerating apparatus and, although capable of various applications and uses it is particularly applicable to refrigerator cars or containers wherein it is desired to control the temperature in a lading space by regulating the flow of a refrigerant. In such systems it is desirable that the thermostatic control be capable of regulation by means of a manually operated device located at a readily accessible point which may be remotely situated with respect to other elements of the system.

One object of the present invention is to provide a thermostatic control system of the character indicated in which a valve for controlling the flow of a refrigerant (either primary or secondary) may be opened or closed as a direct result of the expansion or contraction of a controlling fluid contained in a closed system; and in which thermostatic regulation is effected by varying the volumetric capacity of the closed system at the will of the operator.

Another object of the invention is to provide a form of heat exchange element which renders the closed system containing the controlling fluid extremely sensitive to changes in the temperature of the atmosphere surrounding the heat exchange element. At the same time the heat exchange element and other parts of the closed system are so designed and proportioned as to require the use of only a small quantity of such controlling fluid. This invention thus provides an economical and efficient means of controlling temperature within a space to be refrigerated together with dependable means for regulating the same according to the degree of refrigeration desired for the commodities stored in said space, with such regulation accomplished manually at a remote point readily accessible to an operator.

Another object of the invention is to provide a thermostatic control which is capable of use with refrigerating systems involving a refrigerant of an extremely low temperature, such as dry ice.

Other objects and advantages of the invention, including those derived from simplicity of construction and economy as to manufacture, installation and operation, will become more apparent from the description of a practical embodiment of the invention which follows hereinafter, having reference to the accompanying drawing.

The drawing represents a thermostatic control system of this invention with certain parts thereof shown in section, the valve for controlling the flow of refrigerant being shown in its closed position, and a portion of the thermostatic control rod being broken away.

It may be assumed for the purpose of illustrating an example of a practical use of the invention that the valve body shown at 1 governs the flow of a secondary refrigerant from an end bunker in a refrigerator car in which some suitable medium such as dry ice is used as the primary refrigerant. It may further be assumed that when the valve is open the secondary refrigerant flows from pipe 2 to pipes 3 and 4 from thence to heat transmitting devices disposed at each side of the central lading space of the car. Systems of this general type are well known to those conversant with the art.

The valve body 1 includes a valve 5 which engages and disengages a seat 6 to shut-off or permit the flow of the secondary refrigerant to pipes 3 and 4. By means of a valve stem 7 with a surrounding spring 8 the valve 5 is confined to limited movement and is normally urged to a closed position. The spring 8 at one end abuts against a threaded plug 9 having an external nut 11.

At the opposite side of the valve 5 there is a hollow cylindrical extension 12 accommodating one end of a thrust rod 13. The other end of thrust rod 13 is affixed to a corrugated flexible element 14 housed in a cylindrical casing 15 formed integrally with the valve body 1. The corrugated flexible element 14 is fixed at one end to a portion of the valve body 1 and bears at its free end against a disk 16 which is capable of moving freely within the casing 15. Disk 16 is made of plastic or other material having a low rate of heat conduction. A similarly formed corrugated flexible element 17 constituting the terminal element of a closed duct bears against the opposite face of disk 16, and is housed with a cylindrical extension 18 bolted to the casing 15. By means of a spring 19 surrounding the corrugated element 14 the disk 16 is at all times urged in a direction which will tend to expand the corrugated element 14 and contract the corrugated element 17. On account of the low temperature of the refrigerant in the valve body 1 heat conducting fins 21 are desirably provided at the exterior of the casing 15, these fins providing surfaces of substantial area which absorb heat from the surrounding atmosphere, thus reducing the influence of extremely cold temperatures in the vicinity of the valve body 1 upon the terminal element 17 of the closed duct. Likewise openings 22 are provided in the cylindrical extension 18 of the casing 15 for a similar purpose.

A tube 23 of relatively small diameter and forming a part of the closed duct which controls the valve operating mechanism is joined to the cylindrical extension 18 and leads to the interior of the terminal corrugated element 17. This tube 23 is filled with a controlling fluid which changes its volume with temperature changes in such a way that it produces the required differential pressure in the closed duct responsive to relatively small changes in temperature in the space in which the temperature is to be controlled. In a manner well known to those skilled in the art the terminal element 17 will be caused to expand or contract depending upon whether such temperatures rise or fall. Expansion of the terminal element 17 compresses the similarly formed corrugated element 14 at the opposite side of disk 16 overcoming the pressure of springs 8 and 19 and causes a movement of disk 16 and thrust rod 13 which disengages valve 5 from its seat 6. Contraction of the terminal element 17 permits the corrugated element 14 to expand under the influence of spring 19 causing the disk 16 and thrust rod 13 to be moved in the opposite direction which permits the valve 5 to close under the influence of spring 8.

At a suitable location, as for example in the loading space of a refrigerator car, a heat exchange element 25 joins the tube 23 of the closed duct. The heat exchange element 25 in its preferred form comprises a cylindrical casing 26 with a cylindrical filler 27 therein, the filler having a smaller diameter than the surrounding casing so as to provide an annular space 28 adapted to be filled by the volatile fluid. Adjoining the heat exchange element 25 there is a tubular extension 29 which houses a corrugated flexible element 31 which constitutes a second terminal element for the closed duct which contains the volatile fluid. The terminal element 31 defines a chamber which is in communication with the tube 23 through a passage 32 extending axially through the cylindrical filler 27. An additional transverse passage 33 permits direct communication between the central passage 32 and the annular space 28 between filler 27 and casing 26, and this space opens directly into the interior chamber of terminal element 31.

The annular space 28 forms an elongated channel of substantial area adjacent to the casing 26 which is provided with a series of heat conducting fins 34 which absorb heat from the surrounding atmosphere of the lading space. The fins 34 have a relatively large surface area, that is, such area is many times greater than the surface area of the filler 27. In this manner, without materially increasing the total capacity of the closed duct, means are provided for exposing a substantial proportion of the controlling fluid in the system to the temperature of the space which is to be controlled. Perforations 35 in the tubular extension 29 also cause the terminal element 31 to be directly exposed to the atmosphere of the lading space. Accordingly the system is extremely sensitive to changes of temperature in the lading space and such changes will cause an immediate effect upon the pressure exerted at the terminal element 17.

Regulation of the thermostatic control is accomplished by a threaded control rod 36 which is connected to a movable wall 37 at the free end of terminal element 31. Where the invention is applied to a refrigerator car the control rod 36 may conveniently be extended from the lading space through the roof of the car and terminate in a crank or hand wheel 38 at a point readily accessible to the operator. By turning the control rod 36 the volumetric capacity of the chamber within the terminal element 31 may be varied at will, and hence the volumetric capacity of the entire closed duct may be varied so that the valve 5 controlling the flow of refrigerant may be caused to be opened and closed when predetermined conditions exist in the lading space.

The operation of the control system of this invention will be apparent from the above description of its component elements and their functions. It will be observed that the system is characterized by its simplicity and efficiency. The varying pressure exerted at the terminal element 17 in response to temperature changes in the lading space may be carefully regulated by manipulation of the control rod 36, and the construction of the heat exchange element 25 is such that the apparatus may be rendered highly sensitive to temperature changes. These results are accomplished by an efficient use of the relatively small quantity of controlling fluid with which the closed duct is charged causing the fluid to be quickly brought to the temperature of the atmosphere surrounding the heat exchange element.

It will further be observed that the terminal element 17 at the end of the closed duct and the means associated therewith for opening and closing the valve 5 which regulates the flow of refrigerant are so designed and constructed that the controlling fluid in the closed duct will not be appreciably affected by the low temperatures in the vicinity of valve 5 and hence will expand and contract responsive to temperature changes in the atmosphere surrounding the heat exchange element 25.

Although I have described my invention with reference to one specific application or use of the same showing in detail a preferred embodiment particularly suitable for incorporation in a refrigerator car, it will be apparent that various modifications may be made as to the form of such apparatus, the refrigerant media employed therein and the use to which it is applied without departing from the spirit of the invention as defined in the annexed claims.

Having thus described my invention, I claim:

1. In a thermostatic control system for refrigerating apparatus including a valve for regulating the flow of a refrigerant, a closed duct having a controlling fluid therein, a terminal element at one end of said duct having valve operating means connected therewith for opening and closing said valve responsive to the movement of said terminal element resulting from expansion and contraction of said controlling fluid, a chamber in said duct having a movable wall and means connected therewith for adjusting the volumetric capacity of the duct, and a heat exchange element adapted for location in the space to be refrigerated and comprising an elongated narrow channel forming a part of said duct and disposed in proximity to heat absorbing surfaces of relatively large area.

2. In a thermostatic control system for refrigerating apparatus including a valve for regulating the flow of a refrigerant, a closed duct having a controlling fluid therein, a hollow expansible terminal element at one end of said duct having valve operating means connected therewith for opening and closing said valve responsive to the movement of said terminal element resulting from expansion and contraction of said controlling fluid, a chamber in said duct having a movable wall and remotely controlled manually operated means connected therewith for varying the volumetric capacity of the duct, and a heat exchange element adapted for location in the space to be refrigerated and comprising an elongated narrow channel forming an intermediate part of said duct and disposed in proximity to heat absorbing surfaces of relatively large area.

3. A thermostatic control system as defined in claim 1 in which the heat exchange element is in the form of a casing having exterior heat absorbing surfaces and having therein a filler with the space between such casing and filler forming the narrow channel and communicating with the chamber aforesaid.

4. A thermostatic control system as defined in claim 3 in which the filler of the heat exchange element is provided with interior passages leading from the duct to said chamber and to said narrow channel.

5. A thermostatic control system as defined in claim 3 in which the casing and filler of the heat exchange element are cylindrical with an annular space between them forming the narrow channel aforesaid.

6. A thermostatic control system as defined in claim 2 in which said chamber in the closed duct is formed in a corrugated tubular element having a fixed end attached to said heat exchange element and a free end connected to said remotely controlled means.

WILLIAM M. KELLER.

REFERENCES CITED

The following references are of record in the file of this patent:

UNITED STATES PATENTS

| Number | Name | Date |
|---|---|---|
| 1,408,744 | Keen et al. | Mar. 7, 1922 |
| 1,911,002 | Smith | May 23, 1933 |
| 2,052,894 | Reeves | Sept. 1, 1936 |
| 2,475,556 | Seligman | July 5, 1949 |

FOREIGN PATENTS

| Number | Country | Date |
|---|---|---|
| 436,836 | Great Britain | Oct. 18, 1938 |